May 3, 1966 C. H. SINGLE ETAL 3,249,925
SAMPLE AND HOLD SYSTEM
Filed Nov. 28, 1961 2 Sheets-Sheet 1

CHARLES H. SINGLE
JOHN A. BRUSSOLO
EDWARD W. BILLINGHURST
INVENTORS

BY Louis J. Knobbe
ATTORNEY

May 3, 1966 C. H. SINGLE ETAL 3,249,925
SAMPLE AND HOLD SYSTEM
Filed Nov. 28, 1961 2 Sheets-Sheet 2
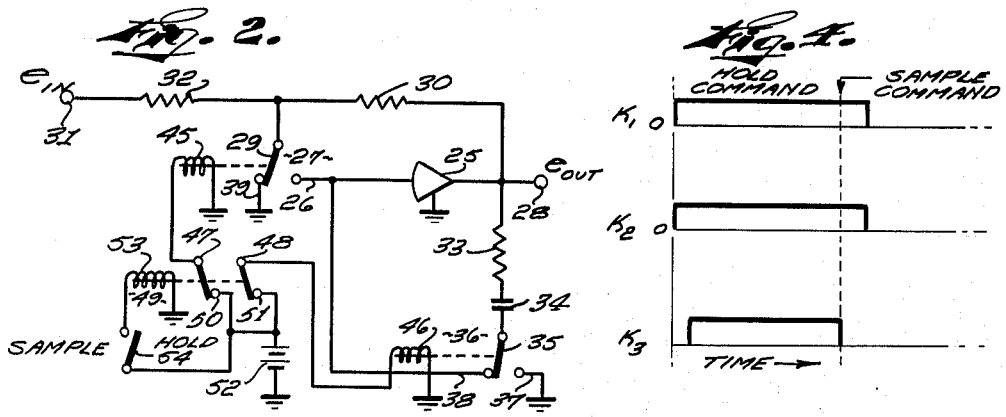
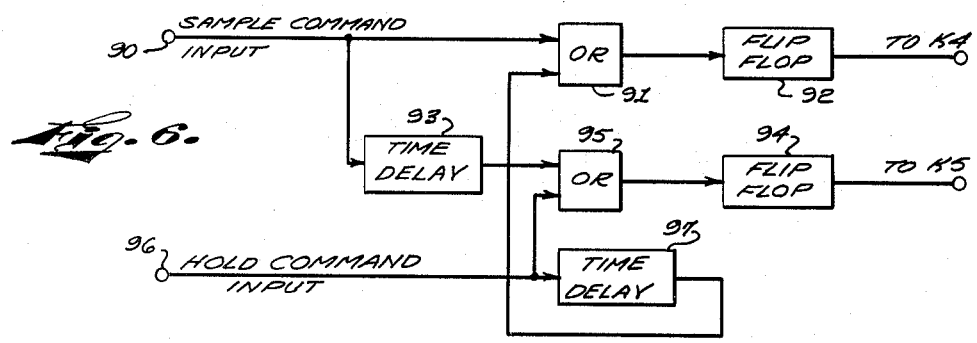
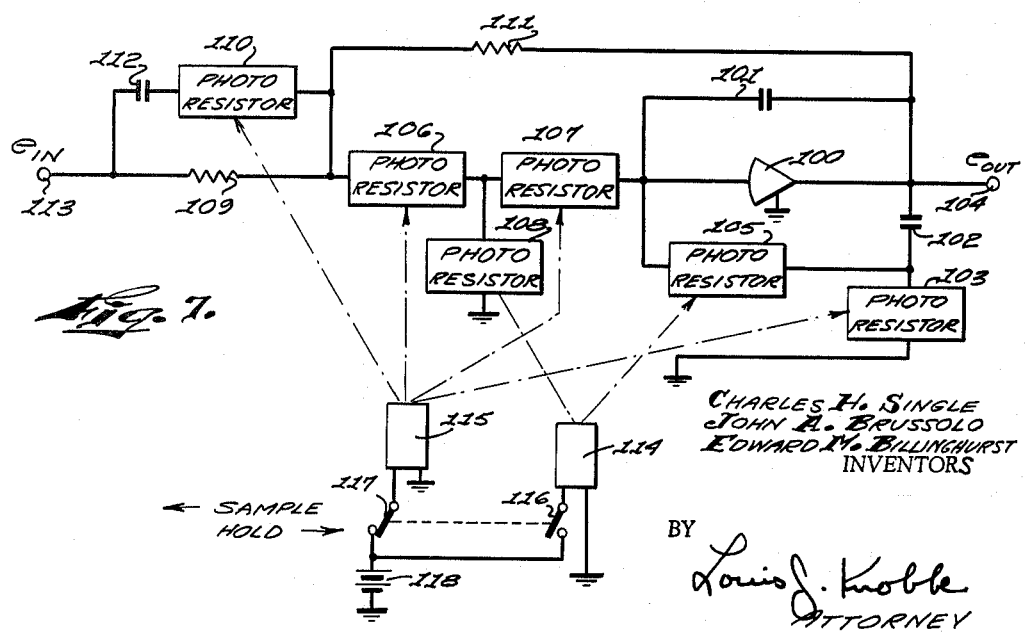
CHARLES H. SINGLE
JOHN A. BRUSSOLO
EDWARD M. BILLINGHURST
INVENTORS
BY Louis J. Knoble
ATTORNEY

United States Patent Office 3,249,925
Patented May 3, 1966

3,249,925
SAMPLE AND HOLD SYSTEM
Charles H. Single, Pleasant Hill, John A. Brussolo, El Cerrito, and Edward M. Billinghurst, Concord, Calif., assignors to Beckman Instruments, Inc., a corporation of California
Filed Nov. 28, 1961, Ser. No. 155,419
9 Claims. (Cl. 340—173)

The present invention relates to sample and hold systems and, more particularly, to sample and hold systems employing a capacitive storage element in combination with an amplifier.

Sample and hold systems presently find extensive application in the electronics art. A specific field of utility is the electronic differential analyzer wherein sample and hold systems find several important applications. Thus, they are used to periodically extract and hold information from the system; they are used to hold information after the machine has been stopped; and they are often used in combination with integrating elements to track or sample a signal representing an initial condition after which the signal value is held for the succeeding integration.

The sample and hold systems presently used in electronic differential analyzers suffer from two main disadvantages: a short hold time, and the impossibility of storing immediately the sample voltage. Both of these shortcomings become evident from examining the representative prior art sample and hold system of FIG. 1 wherein is shown amplifier 10, feedback capacitor 11 connected between the input and output of amplifier 10, relay 12 having a fixed contact 13 connected to the input of amplifier 10 and a movable contact 14 connected to the output of amplifier 10 via feedback resistor 15 and also to input terminal 16 via input resistor 17, and output terminal 18 connected to the output of amplifier 10. The coil 19 of relay 12 is driven by relay control 20. This system operates as follows: during the sample interval, relay control 20 actuates relay 12 at which time the capacitor 11 starts charging to minus the voltage $e_{in}$ at input terminal 16. To hold the sampled voltage, relay 12 is deactuated by relay control 20 at which point the input of amplifier 10 is disconnected from the input terminal 16 and the feedback resistor 15. The voltage stored in capacitor 11 is then maintained across the amplifier 10. However, in an operational amplifier there is always a small amount of grid current (typically 10 picoamperes) which must be supplied by the charge on capacitor 11. The voltage across capacitor 11 will thus decrease with time and provide only a short-time hold interval. Attempts to lengthen the hold time by increasing the capacitance of capacitor 11 deleteriously affects the ability of the system to quickly store the sampled signal. Thus, the RC time constant of resistor 15 and capacitor 11 delays the appearance on the output of amplifier 10 of the input signal. For example, the appearance on the amplifier output of the input signal to within 0.005 percent is delayed by 10 RC. It will be apparent that an increase in the capacitance of capacitor 11 will proportionately lengthen the time interval necessary for storing the sampled input signal.

These conflicting requirements for the value of capacitor 11 usually resolve in a longer hold time being selected to the detriment of delay in storage time. Representative values of resistance 15 and capacitor 11 are then 100,000 ohms and 1 microfarad respectively. The value of 10 RC is then one second, i.e., the storage of the sample voltage to within 0.005 percent is delayed by one second for the system of FIG. 1 with these values as components. In many electronic differential analyzers, particularly those employing a repetitive form of operation, this delay prevents operating the computer at an otherwise faster repetition rate.

Accordingly, it is the principal object of the present invention to provide a sample and hold system which stores the sampled signal voltage after a very brief time interval and, moreover, holds the sampled signal voltage for a relatively long time interval.

Other and further objects, features and advantages of this invention will become apparent as the description proceeds.

Briefly, during the sampling interval, the present invention connects the signal to be sampled to the input of an amplifier, and a relatively large storage capacitor to the output of the amplifier. During the hold interval, the charged capacitor is connected between the input and output of the amplifier, the input having been disconnected from the sampled signal. Because of its large size, the capacitor holds its charge for a relatively long time period thereby providing the desired hold interval. Moreover, since the capacitor is charged from a relatively low impedance source, only an extremely short interval is required to store the sampled voltage.

Sample and hold systems constructed in accordance with the present invention further include a very small capacitor between the input and the output of the amplifier for stabilizing the amplifier during the transition of the storage capacitor. Additional circuitry described hereinafter compensates for the time constant inserted by this additional stabilizing capacitor so that sample and hold systems constructed in accordance with this invention may accurately sample and hold pulses having very fast rise times.

A more thorough understanding of the invention may be obtained by a study of the following detailed description taken in connection with the accompanying drawings in which:

FIG. 2 is a simplified circuit diagram of a sample and hold circuit constructed in accordance with the present invention;

FIG. 4 illustrates the control signals applied to the relays of the system of FIG. 3;

FIG. 6 is a block diagram schematic of the relay control of FIG. 5; and

FIG. 7 is a schematic of still another embodiment of the present invention employing photoresistors instead of mechanical switching elements.

Figure 1:
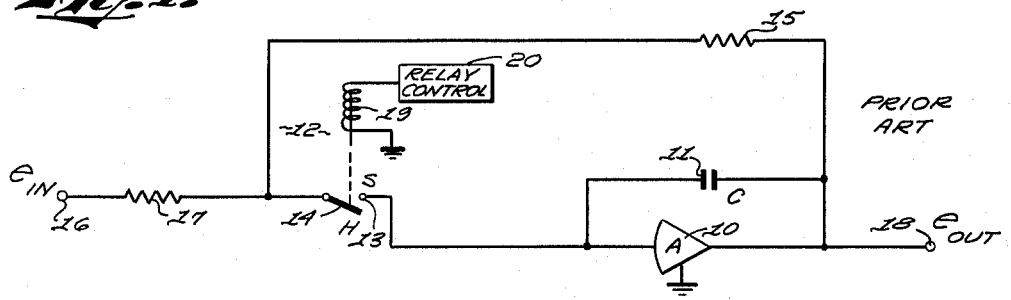
FIG. 1 is a circuit diagram of a prior art sample and hold system.

Referring now to FIG. 2, there is shown in simplified form a sample and hold circuit having an amplifier 25 with its input connected to fixed contact 26 of single pole-double throw relay 27 and its output connected to the output terminal 28. Connected between the moveable contact 29 of relay 27 and the output of amplifier 25 is feedback resistor 30. Moveable contact 29 is also connected to the input terminal 31 via input resistor 32. Connected also to the output of amplifier 25 are series connected current limiting resistor 33, storage capacitor 34, and movable contact 35 of single pole-double throw relay 36. Fixed contacts 37 and 38 of relay 36 are respectively grounded and connected to the input of amplifier 25. Fixed contact 39 of relay 27 is also grounded. Relay coils 45 and 46 of respective relays 27 and 36 are connected to respective moving contacts 47 and 48 of relay 49. Fixed contacts 50 and 51 of this relay are connected together to a source of power represented by battery 52. Actuation of relay coil 53 of relay 49 is controlled by on-off switch 54 having a closed position labeled Sample and an open position labeled Hold.

The operation of the sample and hold system of FIG. 2 is as follows: With control switch 54 in the sample or closed position, relay 49 is actuated by battery 52 thus de-energizing relay coils 45 and 46 of respective relays 27 and 36. Input terminal 31 is then connected to the input of amplifier 25 via input resistor 32 and feedback resistor 30 is connected between the input and output of this amplifier. The de-energization of the relay 36 causes series connected resistor 33 and capacitor 34 to be connected between the output of amplifier 25 and ground. Capacitor 34 will then be charged by the output current of amplifier 25 and will track or sample the signal $e_{in}$ connected to the input terminal 31. Immediately upon closing of control switch 54 to the hold position, the input of amplifier 25 is isolated from the input terminal 31 and feedback resistor 30. Also, series connected resistor 33 and capacitor 34 are connected between the input and output of amplifier 25, the capacitor 34 then serving to store the input voltage previously sampled during the sample interval.

The sample and hold system of FIG. 2 has several important advantages over the prior art circuit shown in FIG. 1. Thus, the value of resistor 33 can be relatively small, e.g., 4,000 ohms since it need only limit the output current from amplifier 25 to the allowable maximum value. With capacitor 34 relatively large, e.g., 1 microfarad, the value of 10 RC is 40 milliseconds, a substantial reduction from the one second delay for the system of FIG. 1.

Although the simplified system of FIG. 2 facilitates understanding of the operation of sample and hold systems constructed in accordance with this invention, the particular circuit shown therein is not a practical arrangement since no means is provided for stabilizing the amplifier 25 during the transition interval for the moveable contacts 29 and 35 of respective relays 27 and 36. Otherwise, the amplifier 25 will tend to saturate during this transition interval.

Figure 3:
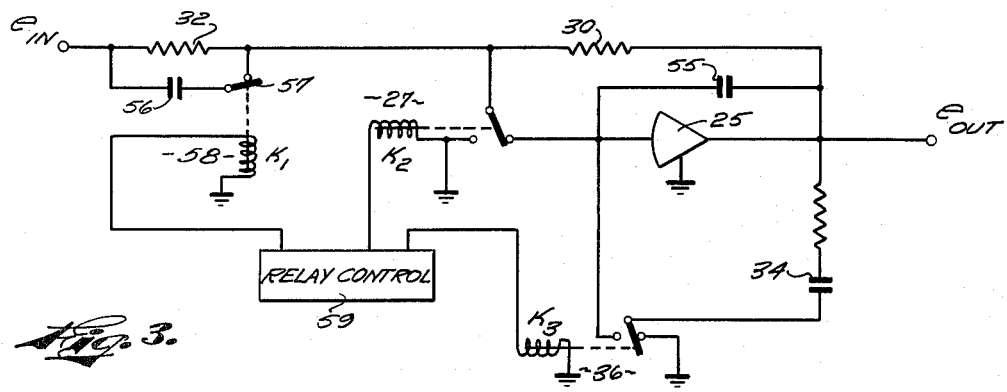
FIG. 3 is a more detailed circuit diagram of a sample and hold system constructed in accordance with the present invention.

A modified form of the sample and hold system of FIG. 2 is shown in FIG. 3 and provides a stabilizing feedback capacitor and means for compensating for the time constant introduced by this additional capacitor. Those components which may be identical in FIGS. 2 and 3 bear the same identification numerals. Thus, the FIG. 3 system includes an additional feedback capacitor 55 connected between the input and output of amplifier 25. This capacitor is preferably quite small, e.g., 1,000 picofarads. The RC time constant of capacitor 55-resistor 30 is therefore quite short so as to minimize the delay in storing the sampled input signal. The capacitor 55 effectively prevents the amplifier input from floating with respect to the output during the transition of relays 27 and 36 respectively labeled K2 and K3. During the hold interval, the sampled signal is stored in the parallel combination of capacitor 55 and capacitor 34. The hold duration of the system of FIG. 3 is therefore comparable to that of a simplified system of FIG. 2.

Although feedback capacitor 55 introduces only a very small time constant, in some applications it may be desirable to be able to sample signals having very fast rise times. For this reason, capacitor 56 is shown connected across the input resistor 32 through the normally closed contacts 57 of K1 relay 58. If the time constants of the resistor 32-capacitor 56 and resistor 30-capacitor 55 are made equal, the time constant introduced by capacitor 55 will be canceled, since the feedback resistance 30 and capacitor 55 function as a lag network whereas the input resistor 32 and capacitor 56 function as a compensating lead network.

In order for the system of FIG. 3 to correctly function, the actuation of relays K1, K2, and K3 by relay control 59 should be as shown in FIG. 4. Thus, in response to a hold command, K1 and K2 are initially energized with K3 being energized after a short time delay. This operation insures that the input of amplifier 25 is disconnected from feedback resistor 30 and input resistor 32 by relay K2 before the storage capacitor 34 is connected between the input and output of amplifier 25 by relay K3. The sample command causes the immediate de-energization of relay K3 followed after a brief interval by the deactuation of relays K1 and K2. This enables the capacitor 34 to be connected to ground prior to the connection of the input signal $e_{in}$ to the input of amplifier 25.

The circuit of FIG. 3 further requires that the contacts of relays K2 and K3 break-before-make so as to prevent the input of amplifier 25 from being grounded during the switch-actuation interval.

Figure 5:
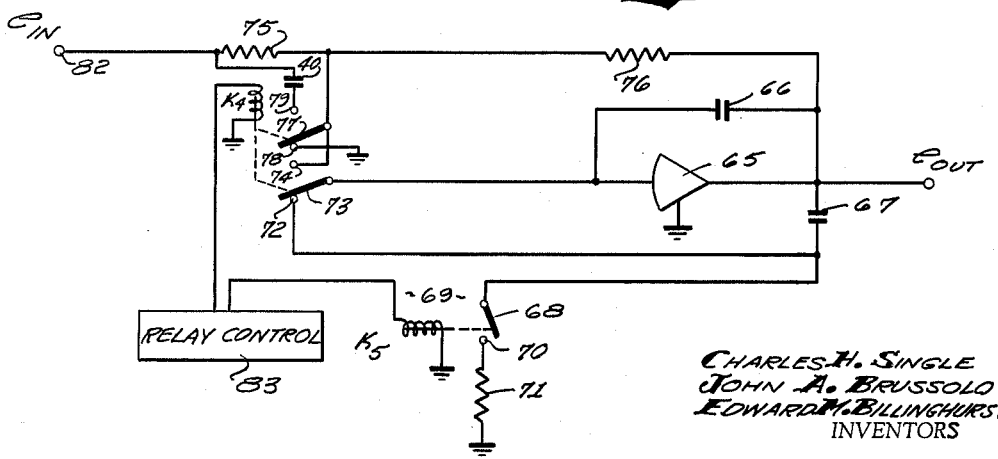
FIG. 5 is a circuit diagram of a preferred embodiment of the present invention.

A preferred embodiment of a sample and hold system is shown in FIG. 5. As shown, this system comprises an amplifier 65 having a stabilizing capacitor 66 connected between its input and output and a storage capacitor 67 connected between the amplifier output and movable contact 68 of K5 relay 69. Fixed contact 70 of relay 69 is connected to ground via current limiting resistor 71. One terminal of capacitor 67 is also connected to fixed contact 72 of relay K4, where K4 is preferably a chopper relay having two sets of contacts which accurately operate in synchronism. Associated with fixed contact 72 are movable contact 73 connected to the input of amplifier 65, and another fixed contact 74 connected to the junction of the input resistor 75 and feedback resistor 76. Also connected to this junction is the other movable contact 77 of relay K4 which engages either grounded contact 78, or contact 79 connected to one end of capacitor 40. The other end of this capacitor is connected to the input terminal 82 which is also connected to the input resistor 75. The coils of both relay K4 and relay K5 are controlled by relay control 83, the circuitry of which is shown in FIG. 6 and described below.

The operation of the sample and hold system of FIG. 5 is as follows: In response to a hold command, the K5 relay opens afterwhich movable contacts 73 and 77 of relay K4 assume the position shown in FIG. 5. The voltage on capacitor 67 is then retained by capacitors 67 and 66 connected in parallel, the large value of capacitor 67 making possible a long hold time. Upon receiving the sample or initial condition control signal, the relay control initially actuates the relay K4 so as to insure that the input of amplifier 65 is disconnected from fixed contact 72 of relay K4 before this contact is connected to ground by the actuation of relay K5.

The system shown in FIG. 5 has several important advantages. Thus, a make-before-break mercury relay may be used as relay K5 thereby greatly facilitating carrying the relatively large charging current of storage capacitor 67 when it is going from the hold condition to the sample condition. This make-before-break operation is permitted because of the circuitry arrangement wherein movable contact 73 of chopper relay K4 prevents the connection of the input of amplifier 65 to the K5 relay until after it has been completely operated. Also, the system of FIG. 5 requires only controlling two relays thereby simplifying the control system.

A representative control system for the system of FIG. 5 is shown in FIG. 6 and operates as follows: A signal pulse on the sample command input terminal 90 drives OR gate 91 to cause flip-flop 92 to trigger to the state wherein coupled relay K4 is actuated. A short time period later, as determined by time delay 93, this signal pulse drives OR gate 95 to trigger flip-flop 94 to its opposite stable state so as to actuate relay K5.

A signal pulse on the hold command input terminal 96 drives OR 95 to trigger flip-flop 94 to its opposite state thus deactuating relay K5. A short time period later, as determined by time delay 97, this signal pulse drives OR gate 91 to trigger flip-flop 92 to its opposite stable state thereby removing power from relay K4.

The foregoing described embodiments of this invention have incorporated mechanical switching devices of one form or another. Since it is an important aspect of this invention to permit very rapid sampling of an input signal, it will be apparent that the switching time for the several switches will be a limiting factor in the maximum sampling rate which may be achieved for a given sample and hold system. Accordingly, very high speed sample and hold systems will preferably include some type of solid state switching device so as to minimize the interval of time required for the switching operation. One such embodiment is shown in FIG. 7 wherein a plurality of photoresistors are employed in place of the relay contacts of the foregoing embodiments. As shown, this system includes an amplifier 100 having a stabilizing capacitor 101 connected between its input and output and a storage capacitor 102 connected between its output and the grounded photoresistor 103. Output terminal 104 is also connected to the output of amplifier 100. The input of amplifier 100 is connected to the common connection of capacitor 102, photoresistor 103 by photoresistor 105. The amplifier input is also connected to one end of series connected photoresistors 106 and 107. Grounded photoresistor 108 is connected to the common connection of photoresistors 106, 107. The other terminal of photoresistor 106 is connected to input resistor 109, photoresistor 110, and feedback resistor 111. The other terminal of feedback resistor 111 is connected to the output of amplifier 100. The other terminal of photoresistor 110 is connected to compensating capacitor 112 which is connected to the other side of input resistance 109 and to input terminal 113. Light source 114 is adapted by suitable light baffling structures (not shown) to illuminate, when energized, photoresistors 105 and 108. Likewise, light source 115 is adapted, when energized, to illuminate respective photoresistors 103, 106, 107, and 110. Ganged switches 116, 117 control the flow of current from battery 118 to the light sources 114, 115. Thus, in the sample position, switch 116 is open and switch 117 is closed whereas in the hold position, switch 116 is closed and switch 117 is open.

The operation of the system of FIG. 7 is as follows: In the sample position, light source 115 is energized by battery 118 through the closed contacts of switch 117 and illuminates photoresistors 103, 106, 107, and 110 so as to lower the resistance of these elements. The input of amplifier 100 is then connected to the output of input resistance 109; compensating capacitor 112 is then connected in parallel with input resistance 109; and charging capacitor 102 is then connected to ground. The capacitor 102 is then charged by the output current of amplifier 100. When switches 116, 117 are actuated to the hold position, light source 115 is cut off thereby increasing the resistance of photoresistors 103, 106, 107, and 110 to a relatively high value. Source 114 is then energized; the resistance of photoresistors 105 and 108 is then lowered to a low value. Accordingly, storage capacitor 102 is connected through a low resistance to the input of the amplifier 100 and the midpoint of resistors 106, 107 is grounded, thereby preventing leakage of the input signal to the input of the amplifier 100.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim:
1. A sample and hold system comprising:
an amplifier;
a storage capacitor having one terminal connected to the output of said amplifier;
first switch means for selectively connecting the other terminal of said storage capacitor either to ground or to the input of said amplifier;
a feedback resistor having one terminal connected to the output of said amplifier;
second switch means for selectively connecting the other terminal of said feedback resistor to the input of said amplifier;
input terminal means connected to the other end of said feedback resistor; and
means connected between the input and output of said amplifier for stabilizing said amplifier during the actuation of said first and second switch means.

2. The sample and hold system defined in claim 1 wherein:
said amplifier stabilizing means is a stabilizing capacitor, said stabilizing capacitor being considerably smaller than said storage capacitor.

3. The sample and hold system defined in claim 2 comprising:
a lead network for compensating for the RC time constant of said feedback resistor and stabilizing capacitor.

4. The sample and hold system defined in claim 3 wherein said lead network comprises:
a compensating capacitor;
third switching means for selectively connecting said compensating capacitor in parallel with the input resistor of said input terminal means, the RC time constant of said input resistor and compensating capacitor being substantially equal to the RC time constant of said feedback resistor and stabilizing capacitor.

5. A sample and hold system comprising:
an amplifier;
a small stabilizing capacitor connected between the input and output of said amplifier;
a first switching means having a first movable contact adapted to engage either a first or a second fixed contact, and a second movable contact adapted to engage either a third or a fourth fixed contact;
a second switching means for selectively interconnecting a first terminal with a second terminal;
a relatively large storage capacitor connected between the output of said amplifier and the first terminal of said second switching means;
means for limiting current connected between the second terminal of said second switch and ground;
means connecting the first fixed contact of said first switching means to the first terminal of said second switching means;
means connecting the first movable contact of said first switching means to the input of said amplifier;
a feedback resistor connected between the output of said amplifier and the second fixed contact of said first switching means;
an input resistor connected between an input terminal and the second fixed contact of said first switching means;
a compensating capacitor connected between said input terminal and the fourth fixed contact of said first switching means;
means connecting the second movable contact of said first switching means to the second fixed contact of said first switching means;
and means connecting the third fixed contact of said first switching means to ground.

6. The sample and hold system defined in claim 5 comprising:
control means responsive to sample and hold control signals connected to said first and second switching means for, upon receipts of a sample control signal, initially connecting the first and second movable contacts of the first switching means to respective second and fourth fixed contacts thereof and, after a predetermined time delay, connected the first and second terminals of said second switching means; and, upon receipt of a hold control signal, initially disconnected the first and second terminals of said second switching means, and, after a predetermined time delay, connected the first and second movable contacts of the first switching means to respective first and third contacts thereof.

7. The sample and hold system defined in claim 5 wherein:
said second switching means incorporates make-before-break type contacts.

8. A sample and hold system comprising:
an amplifier;
a small stabilizing capacitor connected between the input and output of said amplifier;
first, second, third, fourth, fifth and sixth photoresistors;
a relatively large storage capacitor connected in series with said first photoresistor between the output of said amplifier and ground;
a second photoresistor connected between the input of said amplifier and the connection between said storage capacitor and said first photoresistor;
an input resistor having one terminal connected to an input terminal;
series connected third and fourth photoresistors connected between the other terminal of said input resistor and the input of said amplifier;
means connecting said fifth photoresistor between ground and the connection between said third and fourth photoresistors;
a feedback resistor connected between the other terminal of said input resistor and the output of said amplifier;
and series connected compensating capacitor and said sixth photoresistor connected in parallel with said input resistor.

9. The sample and hold system defined in claim 8 comprising:
a first light source means for illuminating said first, third, fourth, and sixth photoresistors in response to a sample control input signal;
and a second light source means for illuminating said second and fifth photoresistors in response to a hold control input signal.

References Cited by the Examiner
UNITED STATES PATENTS

| | | | |
|---|---|---|---|
| 2,843,736 | 7/1958 | Huntley | 320—1 |
| 2,903,185 | 9/1959 | Myers | 235—188 |
| 3,050,673 | 8/1962 | Widmer | 320—1 |

BERNARD KONICK, *Primary Examiner.*

IRVING L. SRAGOW, *Examiner.*

R. G. LITTON, T. W. FEARS, *Assistant Examiners.*